United States Patent [19]

Zook et al.

[11] Patent Number: 4,947,035
[45] Date of Patent: Aug. 7, 1990

[54] FIBER OPTIC TRANSDUCER USING FARADAY EFFECT

[75] Inventors: Brian J. Zook; Clifford R. Pollock; Jeffrey A. Morris, all of Ithaca, N.Y.

[73] Assignee: Cornell Research Foundation, Inc., Ithaca, N.Y.

[21] Appl. No.: 229,317

[22] Filed: Aug. 8, 1988

[51] Int. Cl.⁵ ............................................. G02F 1/01
[52] U.S. Cl. ............................. 250/225; 250/227.21; 324/96
[58] Field of Search ................. 250/227, 231 R, 22 S, 250/231 SE; 324/96, 174, 175

[56] References Cited

U.S. PATENT DOCUMENTS

| | | |
|---|---|---|
| 3,041,483 | 6/1962 | Ebbinghaus et al. . |
| 3,732,494 | 5/1973 | Dragon . |
| 3,787,770 | 1/1974 | Cote et al. . |
| 4,045,738 | 8/1977 | Buzzell . |
| 4,112,367 | 9/1978 | Hepner et al. ........................ 324/96 |
| 4,529,875 | 7/1985 | Brogardh et al. . |
| 4,529,932 | 7/1985 | Doueihi et al. . |
| 4,539,521 | 9/1985 | Matsumoto . |
| 4,554,449 | 11/1985 | Taniuchi et al. . |
| 4,560,932 | 12/1985 | Mitsui et al. ........................ 324/96 |
| 4,584,470 | 4/1986 | Iizuka et al. . |
| 4,612,501 | 9/1986 | Costello et al. . |
| 4,626,781 | 12/1986 | Forkel . |
| 4,639,807 | 1/1987 | Sekizawa et al. . |
| 4,700,133 | 10/1987 | Day . |
| 4,746,791 | 5/1988 | Forkel ........................ 250/231 SE |
| 4,843,232 | 6/1989 | Emo ........................ 250/225 |

*Primary Examiner*—David C. Nelms
*Attorney, Agent, or Firm*—Jones, Tullar & Cooper

[57] ABSTRACT

The present invention relates, in general, to optical transducers, and more particularly to optical transducers utilizing the Faraday effect and responsive to changes in a magnetic field produced by a target. These changes in magnetic field produce a modulation in the light passing through a ferrite crystal, and this modulation can be used to measure mechanical motion, proximity, and related parameters.

21 Claims, 2 Drawing Sheets

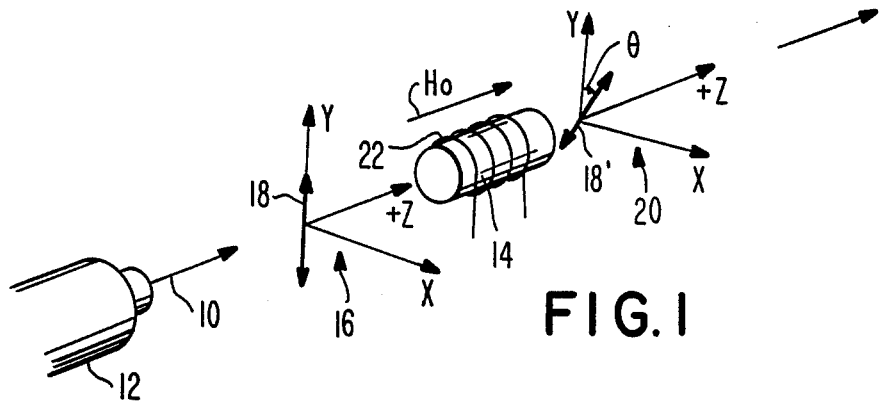
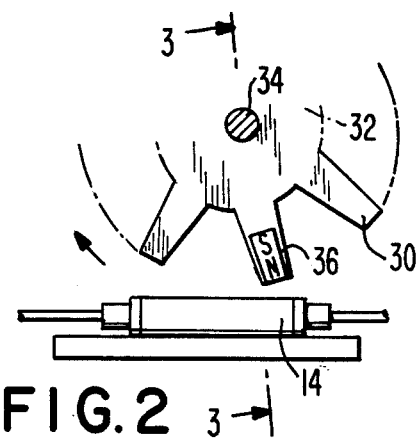
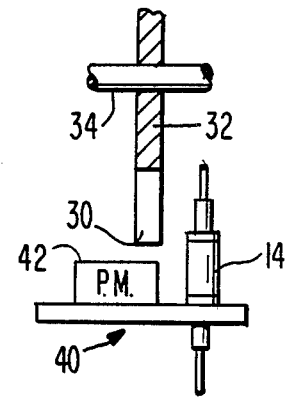
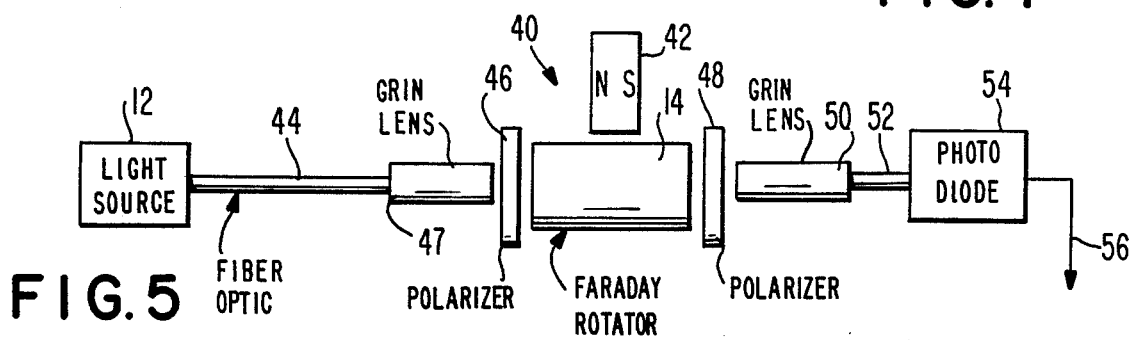
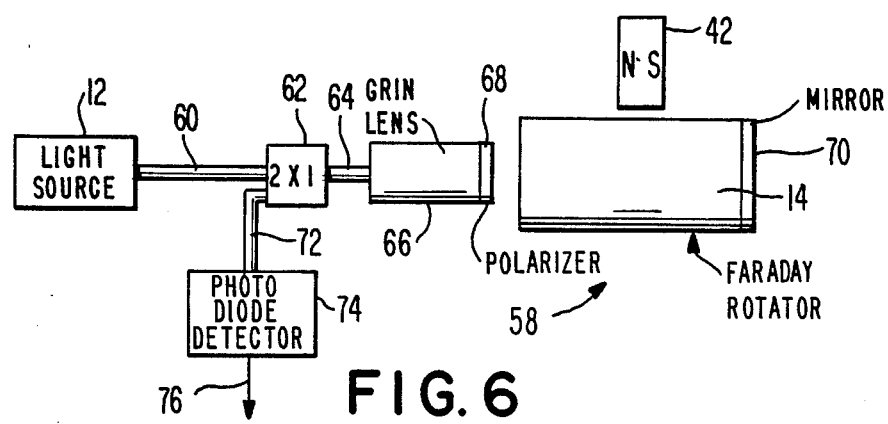

FIBER OPTIC TRANSDUCER USING FARADAY EFFECT

BACKGROUND OF THE INVENTION

The detection of mechanical parameters such as the rate of rotation of a shaft has been accomplished in a variety of ways in the prior art, through the use of a wide range of magnetic, electromagnetic and optical systems. Such systems have often relied on magnetic field measurements such as the measurement of fields produced by the motion of a permanent magnet and by measurement of a magnetic field produced by the flow of electric current. In addition, numerous systems have been developed for optical measurement of motion, such as through the use of optically encoded shields or discs. Although such optical devices have been generally suitable for a wide variety of applications, there are conditions where such systems are not entirely satisfactory for they are usually extremely sensitive to alignment and vibration, and thus are often difficult to mount and adjust for accurate and reliable operation in adverse environmental conditions. Furthermore, many measuring systems are intrusive, in that they adversely affect the target being monitored or are adversely affected by the target environment, and many such systems are sensitivity to electromagnetic interference, thus limiting their usefulness.

SUMMARY OF THE INVENTION

Accordingly, it is an object of the present invention to provide a transducer system that is non-intrusive, that is capable of measuring mechanical quantities such as motion or proximity with accuracy and reliability, and which is insensitive to electromagnetic interference. It is also an object of the invention to provide an optical transducer probe that is easily positioned, without the need for modification of the target device being monitored, and which is isolated from any mechanical connection to the device being monitored so as to avoid adversely affecting the target as well as avoiding problems of vibration in the probe itself.

Briefly, the optical transducer of the present invention is a compact, self-contained probe which utilizes the modulation of the Faraday rotation of light in a ferrite material as a measure of a parameter to be detected. The probe includes fibers for carrying light to and from a ferrite rod which is placed in the biasing field of a permanent magnet to produce a predetermined amount of Faraday rotation. The magnetic field is modulated, for example, by the mechanical motion of a target device to be detected, and this changing magnetic field modulates the angle of rotation of the light passing through the ferrite rod. The light passing through the ferrite is then detected to produce a modulated output signal which represents the motion being detected.

BRIEF DESCRIPTION OF THE DRAWINGS

The foregoing and additional objects, features and advantages of the present invention will become apparent to those of skill in the art from a consideration of the following detailed description of preferred embodiments thereof, taken in conjunction with the accompanying drawings, in which:

FIG. 1 is a diagrammatic illustration of the principles of Faraday rotation in a ferrite;

FIG. 2 is a diagrammatic illustration of a transducer utilizing an optical probe to measure a changing magnetic field;

FIG. 3 is a cross-sectional view taken along lines 3—3 of FIG. 2;

FIG. 4 is a cross-sectional view of a modified form of the device of FIG. 3, utilizing a stationary magnetic biasing field for the optical probe;

FIG. 5 is an exploded partial view of the optical probe of FIG. 4;

FIG. 6 is a modified form of the optical probe of FIG. 5.

DESCRIPTION OF PREFERRED EMBODIMENTS

Figure 7:
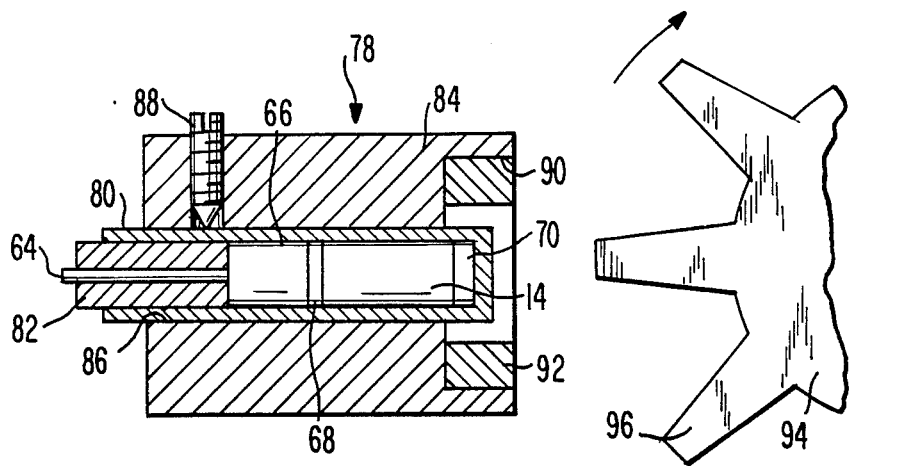
FIG. 7 is a further modification of the probe of FIG. 6.

The Faraday effect is a magneto-optical effect that causes the rotation of the polarization of a linearly-polarized light wave as it passes through certain materials. As illustrated diagrammatically in FIG. 1, for a linearly-polarized light wave travelling parallel, or anti-parallel, to an applied magnetic field in a ferrimagnetic medium, the polarization of the wave is rotated. This rotation is proportional to the distance travelled through the medium, and also depends upon the material used and the magnitude of the magnetization induced in the material by the applied magnetic field. The polarization rotates about the magnetic field vector in accordance with the right-hand rule for optical frequencies. While the relationship between the induced magnetization and the applied magnetic field is non-linear, for non-saturating fields, the magnetization is proportional to the applied field, making the polarization rotation also proportional to the magnetic field. For more details on the derivation of the Faraday effect, one can refer to various works in the literature, such as *Theory and Applications of Ferrites* by Ronald Soohoo (Englewood Cliffs, N.J.:Prentice-Hall, 1960, near page 119.)

Because of the proportionality between the rotation and the applied magnetic field, a transducer can be produced using this effect by causing a target device which is to be monitored to modulate the magnetic field, and using optics to sense the resulting rotation of the polarization. Thus, the transducer converts the mechanical motion of the target device being monitored to a light modulation which then produces an electrical output indicative of the motion being detected. In the present application, this transducer is illustrated as a tachometer responsive to the rotation of a shaft, but other applications will be evident to those of skill in the art.

Faraday rotation is a non-reciprocal effect, differing from the more common reciprocal effects of birefringence and optical activity. For linearly polarized light at optical frequencies, the polarization rotates about the magnetic field vector in accordance with the right-hand rule, independent of the direction of propagation. As illustrated in FIG. 1, light 10 from a source 12, such as a laser or an LED, is directed into and through a ferrimagnetic material 14 which functions as a Faraday rotator for the light. The coordinate system 16 illustrates that the light 10 is travelling in the plus Z, or axial, direction through material 14, and is linearly polarized before reaching the rotator material as indicated by the arrow 18. The rotator material 14 is subject to a magnetic field indicated by arrow $H_o$ which is also in the plus Z direction within the material 14. As indicated by the coordinate system 20 at the output and of the material 14, the polarization of the light rotates clockwise about the plus Z axis when both the magnetic field and the light propagation are in the plus Z direction. This is indicated by the arrow 18' having rotated in a clockwise direction through an angle $\theta$. If the light should travel in the opposite direction, the rotation angle continues to be clockwise about the plus Z axis. A very beneficial result of this non-reciprocal behavior is that if the light is reflected at the far end of the material and forced to reverse its path, the net polarization rotation is doubled instead of being cancelled.

The Faraday effect is dependent on the magnitude of the magnetic field to which the optical material is subjected, accordingly, changes in the effect occur with changes in that field. Such changes can be produced, for example, by varying the electric current which produces the field, as by varying the current which flows in a coil 22 (FIG. 1) surrounding the material 14, or can be produced by moving the source of the magnetic field with respect to the Faraday material 14. This response to changing magnetic fields is the basis for the transducer of the present invention.

Figure 8:
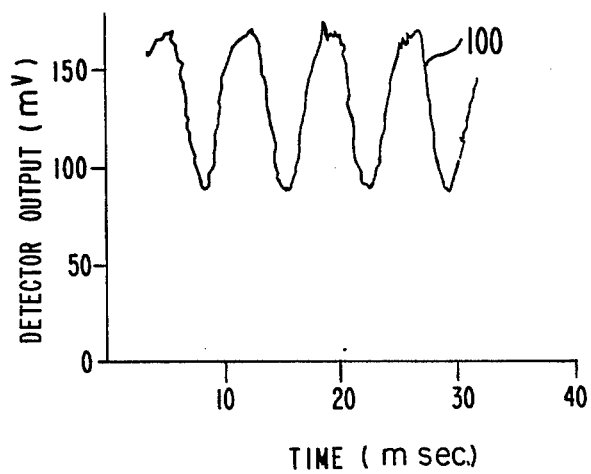
FIG. 8 is a diagrammatic illustration of the output signal available from the optical probe of the present invention.

FIG. 2 illustrates in diagrammatic field a transducer in which a permanent magnet is moved with respect to the Faraday material 14 to produce a change in the magnetic field within the material. The permanent magnet is mounted, for example, on one of the teeth 30 of a toothed wheel 32 mounted for rotation on a rotary shaft 34. Although permanent magnets can be mounted on one or more of the teeth, FIGS. 2 and 8 illustrate a single permanent magnet mounted on one of the teeth. Rotation of wheel 32 moves the permanent magnet past the material 14 to produce a changing magnetic field which, in turn, produces a changing amount of rotation in the light passing through the material. This changing angle of light rotation can be measured to yield information about the shaft rotation.

Although it is possible to obtain a measurement by mounting a permanent magnet on a shaft in the manner illustrated in FIGS. 2 and 3, such an arrangement is undesirable if high speeds of rotation are to be measured, because a magnet will tend to produce an unbalance in the rotating wheel and can produce stresses in the material of the wheel which can eventually lead to failure. Furthermore, magnets tend to be fairly fragile when compared to industrial steel, and at high speeds the magnet can fly apart. In addition, hot lubricating oils surrounding moving machine parts can degrade the magnet.

A preferred form of the present invention is illustrated in FIG. 4, wherein the toothed wheel 32 is of high permeability material such as iron or steel and is positioned adjacent an optical probe which is diagrammatically illustrated at 40. This probe 40 includes a Faraday rotator material 14 and a permanent magnet 42 mounted closely adjacent the material 14 so as to produce an axial biasing field in the material 14. The bias field establishes a predetermined rotational angle in light passing axially through the material. The probe 40 is positioned close to the toothed wheel so that as wheel 32 rotates, the high permeability of the tooth 30 alters the magnetic biasing field in the ferrite about the bias value produced by the permanet magnet 42. By modifying the magnetic field surrounding the magnet, the field inside the material 14 is changed so that the angle of light rotation in the material is varied. Many such configurations are possible, as long as it is the component of the magnetic field which is parallel to the path of light in the material 14 that is modulated.

There are several possible methods for directing light to and from the Faraday rotator material 14. In the diagrammatic illustration of FIG. 5, light from a source 12 is carried to the Faraday rotator material by ways of an optical input fiber 44 which supplies the light to a quarter pitch graded index, or GRIN, lens 46 which collimates the light from the input fiber. The light is then directed through a linear polarizer 47 and into the Faraday rotator material 14, passes through material 14 and then through an output polarizer 48 which serves as an analyzer to determine the degree of rotation of the light passing through the rotator 14. The polarizer 48 is arranged at a suitable angle with respect to polarizer 47 so that in the absence of any modulating influences, the static biasing magnetic field produced in the Faraday rotator by the permanent magnet produces a known output of light through polarizer 48. The light passing through polarizer 48 is directed to a second GRIN lens 50 which focuses the light onto an output optical fiber 52 which in turn supplies the light to a detector such as a photodiode 54. The photodiode produces an electrical output on line 56 which is a measure of the amount of light passing through the second polarizer 48, and thus is a measure of the degree of rotation of the light passing through the rotator 14. The output light from polarizer 48 is as follows:

$$I = \frac{I_0}{2} \cos^2(\theta - \phi_{pol} + \Delta\theta) \qquad \text{Equation 1}$$

where $\theta$ is the static Faraday rotation, $\phi_{pol}$ is the relative angle between the two polarizers, and $\Delta\theta$ is the change in Faraday rotation.

Although such an arrangement is effective, it can produce problems in actual measurement situations, since the optical fibers must have access to both ends of the crystal, and in some measurement situations, it may be difficult to provide such access.

An alternative probe arrangement is illustrated at 58 in FIG. 6, which may be referred to as a reflective-mode configuration, and which utilizes the non-reciprocity of the Faraday effect. In this probe, light is directed from source 12, which may be a light-emitting diode (LED) having a wavelength corresponding to a low-absorption high-Faraday effect region of the Faraday material used. The light is supplied through an optical fiber 60, a 2×1 directional coupler 62, a fiber 64 and a GRIN lens 66 which collimates the light and supplies it to a polarizer 68, in the manner explained with respect to FIG. 5. The light passes through the polarizer and then through the rotator material 14, where it reflects off a mirror 70 on the back face of the rotator. The reflected light passes back through the rotator material and the polarizer 68, which now functions as an analyzer, and is coupled back into the fiber 64 by the GRIN lens 66. The light from fiber 64 is deflected by the directional coupler 62 into an output fiber 72 and then to a detector such as a photodiode 74 which functions, as previously explained, to produce a corresponding output signal on line 76. Because the Faraday effect is non-reciprocal, the polarization rotation is doubled instead of being cancelled in this embodiment, and the output of the sensor is expressed as follows:

$$I = \frac{I_o}{2} \cos^2[2*(\theta + \Delta\theta)] \quad \text{Equation 2}$$

Although this arrangement has the advantage of doubling the Faraday rotation with respect to the bias rotation, and has the further advantage of requiring only a single fiber so that fiber access is needed only at one end of the ferrite material, alignment of the components is more critical in this embodiment, since the optical fiber must be located very near the axis of the GRIN lens, and the mirror must be perpendicular to the path of the light. Misalignments cause a reduction in the amount of light returned to the detector 74. In practice, it is desirable to fix critical alignments using optical cement in order to minimize the effects of probe movement and vibration.

The static bias point of the devices of FIGS. 5 and 6 established by the permanent magnet 42 significantly affects both the form of the modulated light output and the sensitivity of the probes 40 and 58. As illustrated by Equations 9 and 10, the basic output of both probes follows a cosine-squared curve, and the bias point is determined by the static argument of the cosine-squared function, either $2\theta$ or $\theta - \phi_{pol}$. The sensitivity to field modulation is greatest when this static argument is equal to 45°. $\theta$ is determined by the instantaneous magnetization of the body of the rotator material, which may change in response to changes in the magnet itself, or in response to changes in the relative positions of the probe and the magnet. In the case of the probe of FIG. 5, the relative angles of the axes of the input and output polarizers 47 and 48 establish the sensitivity of the probe. The polarizers may be Polaroid film devices, which are relatively inexpensive, simple, and easy to use. For some applications, particularly for high temperature use, glass polarizers may be used, but expensive calcite or birefringement polarization prisms are not needed.

The ferrimagnetic material preferred for use in one form of the probe of the present invention and illustrated herein is yttrium-iron garnet (YIG). This ferrite has a fairly high Faraday rotation effect, providing 220° of rotation per centimeter under conditions of saturation magnetization, with light having a wave length of 1.3 micrometers. YIG is essentially opaque in the visible light spectrum, having an absorption coefficient on the order of $10^3$ per centimeter near 600 nm, so it must be used with longer wavelengths, where its absorption coefficient is approximately 0.6 per cm at 1.3 micrometers. Although the saturation Faraday rotation for YIG is not as great as it is for other materials, the overall figure of merit for this material is quite high, due to the low absorption coefficient for light having wavelengths above 1 micrometer. The Curie temperature, the point where the magnetization drops to zero, is 280° C., causing no concern for room temperature use of this material, although suggesting that other materials should be considered for use at higher operating temperatures.

Another version of the probe 58 of FIG. 6 is illustrated in FIG. 7 at 78, wherein elements similar to those of FIG. 6 are similarly numbered. Thus, the GRIN lens 66, polarizer 68, Faraday rotator 14 and mirror 70 are assembled, as by means of optical cement, and this fragile detector assembly is mounted in a nonmagnetic, for example, brass, protective tube 80. A brass plug 82 fits into tube 80 behind the GRIN lens, and the tube is mounted in a probe housing 84. The housing 84 preferably is nonmagnetic, for example, aluminum, and incorporates an axially extending aperture 86 which receives the tube 80, which is secured in the housing by means of a set screw 88, for example. The brass plug 82 includes an axial aperture through which extends the optical fiber 64. An enlarged aperture 90 coaxial with aperture 86 is formed at the end of the housing nearest the rotator 14 and receives a ring magnet 92, the ring magnet being located close to or overlapping the mirrored end of the Faraday rotator 14 so as to produce an axially extending magnetic field in the rotator. The housing and its enclosed detector assembly provides the probe generally indicated at 78 which can then be placed adjacent a device which is to be monitored, such as a toothed wheel 94 mounted on a rotating shaft (not shown). The wheel 94 preferably is formed of a ferromagnetic material such as iron or steel so that each of the teeth 96 will affect the magnetic field set up by the permanent ring magnet 92 as it passes by the end of probe 78 so that the magnetic field established by magnet 92 is modulated by the passage of each tooth. Although magnet 92 is shown as a ring-type magnet, other magnets, such as a disc-type magnet, will also work, and may be preferred in some cases.

In a test of the probe 40 illustrated in FIGS. 4 and 5, a cylindrical piece of YIG material 5 mm in diameter and 6.3 mm long was placed near a cobalt disc magnet rated at 8200 Gauss. The light source 12 was a helium neon laser having a wavelength of 1.15 micrometers, and infrared Polaroid polarizers were used. The input and output polarizers 47 and 48 were adjusted so that in the absence of a steel tooth, the bias rotation was equal to 45°. As the wheel 32 rotated with shaft 34 and each tooth in turn passed by the permanent magnet 42, the light rotation provided by the Faraday rotator 14 was modulated, the presence of each metal tooth serving to pull the magnet's flux lines closer to the rotator 14 to produce a higher density of flux lines within the crystal. The modulation depth (high reading minus low reading divided by the high reading) for this configuration was 34%.

The probe 58 of FIG. 6 was also arranged adjacent a rotating wheel in the manner illustrated in FIG. 4 and was tested. In this arrangement, the magnetic flux established by the permanent magnet 42 was used to set the bias point, rather than the relative rotation of the two polarizers 47 and 48, as was the case in the device of FIG. 5. In this test, the light source 12 was an LED operating at a 1.3 micrometer wavelength, and the photodiode detector 74 was a germanium detector. With this system, the detected optical power was on the order of 0.5 microwatts, which was sufficient for measurement using ordinary electronics.

Although the configuration of FIGS. 4 and 6 worked quite well, the arrangement of FIG. 7, with the ferrite rotator material 14 being located on the axis of the ring magnet 88, is preferred because the probe configuration is convenient and easy to use. In this arrangement, the probe 78 may be located so that the steel teeth 96 approach the magnet on the opposite side from the location of the ferrite material 14, With the effect that the steel tooth "pulls" the magnetic field lines toward itself, increasing the flux density in the tooth. This decreases the flux density in the ferrite and thus changes the Faraday rotation. At the optimum bias position, as determined by the location of the rotator material 14 with respect to the magnet 92, the probe of FIG. 7 was observed to have a modulation depth of approximately 50%. This modulation can be increased, for example, by reducing Fresnel reflections in the optical system, much of which occurs at the interfaces of the ferrite.

A typical output for the photodiode detector 74 is illustrated in FIG. 8, wherein the curve 100 represents the modulation of the output current due to passage of the teeth 96 past the end of the probe 78. The superimposed low-level noise seen as small variations in the curve 100 is principally due to the dark current of the detector, since the optical signal is less than 1 microwatt. The modulation depth of the sensor can be varied by moving the ferrite 14 in and out of the holder 84, and this affects the bias point of the operation as well as the efficiency of the magnetic field modulation. It will be understood that the frequency of the signal indicated by curve 100 represents the rate of rotation of the shaft 94 so that the probe 90 serves as a tachometer. The variation in the amplitude of the signal also indicates that the detector is useful in determining the proximity of a target such as the teeth 96.

Figure 9:
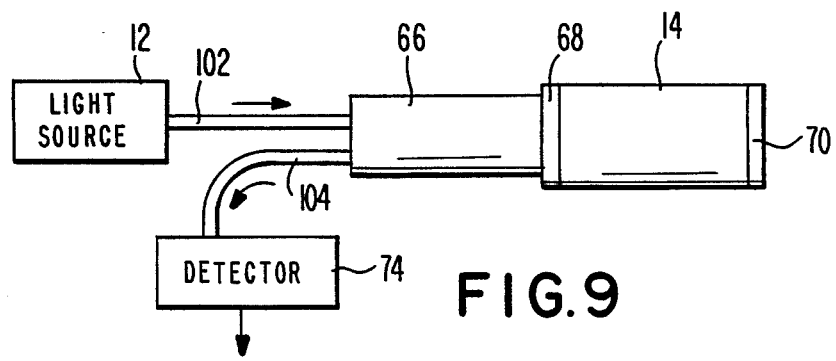
FIG. 9 is a still further modification of the probe of FIG. 6.

A modification of the arrangements of FIG. 6 and 7 is illustrated in FIG. 9, where instead of the directional coupler 62 and the single fiber 64, two optical fibers are provided, one connected as an input and the other connected as an output. Thus, the light source 12 may be connected to the GRIN lens 66 by means of an input optical fiber 102 which is placed off-axis of the GRIN lens. The light passes through lens 66, polarizer 68, and the Faraday rotator 14 and is then reflected from mirror 70 back through the rotator 14 and the polarizer 66 in the manner previously described. The return light is focused by the GRIN lens off-axis, on the opposite side of the axis from the input fiber 102, and a return fiber 104 is positioned at this off-axis location. This return fiber then feeds the output light to the detector 74. Because the sizes of the fibers do not need to be the same, proper choice of fiber diameters can ease the alignment criteria for this device.

Figure 10:
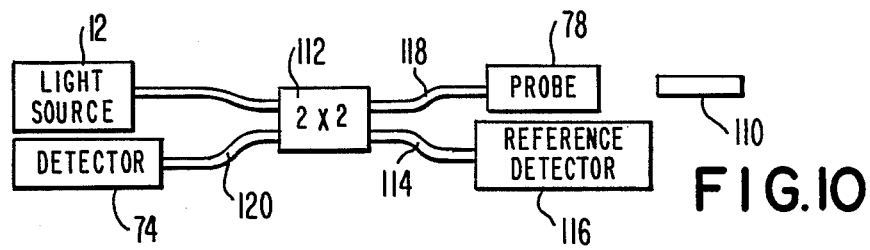
FIG. 10 is another modification of the probe of FIG. 6.

A further embodiment is illustrated in FIG. 10, wherein an arrangement is illustrated for monitoring the intensity of the light source. This arrangement is particularly useful when the probe, such as the probe 78, is used for applications other than as a tachometer; for example, when it is used as a proximity sensor for detecting the proximity of the probe to a ferromagnetic target such as a steel bar 110. When using the sensor as a tachometer, as illustrated by FIGS. 7 and 8, the rotation information is contained in the modulation frequency of the detected light, which is completely independent of the intensity of the source. But for use as a proximity detector, some form of source monitoring is desirable to counteract drift, since it is the intensity of the output signal rather than its modulation frequency that becomes important. The need for compensation is dependent upon the accuracy required for such measurements, but in the arrangement of FIG. 10, monitoring of the source is obtained through the use of a 2×2 directional coupler 112 located between the light source and the probe. The 2×2 coupler directs a predetermined portion of the light from source 12 through optical fiber 114 into a reference detector 116, with the remainder of the light going to the probe 78 through fiber 118 in the manner previously described. Return light from probe 78 passes through the coupler 112 to photodetector 74 by way of fiber 120 for measurement in the previously-discussed manner, with the amplitude of the return signal being an indication of the modification of the magnetic field in the probe as affected by the proximity of target 110.

The optical transducer of the present invention has numerous advantages. First, it is insensitive to electromagnetic interference and electromagnetic pulse effects, and further has the advantage of compactness and light weight. In addition, the device is nonintrusive and is compatible with currently available tachometers. Although the device uses light intensity to carry the modulation, the device is not strictly an intensity sensor when it is used as a tachometer, but actually measures the frequency or phase of the optical signal instead of its amplitude. This makes the tachometer performance insensitive to minor losses in the system. A third advantage is that the design allows for easy confirmation of system operation and integrity, since after installation the fiber connections and the detection circuitry can be tested simply by moving the target which is to be detected. For example, the position of a tooth 96 with respect to the probe provides a change in the output signal of the probe which can be detected without having to rotate the wheel 94 by turning on the drive mechanism to which it is connected. Although prior sensors have been based upon the Faraday effect, such devices have used direct measurements of the magnetic field as the sensing method. In the present invention, however, the sensing is of the modulation of the magnetic field rather than the field itself, thereby removing the need to make absolute measurements and improving the ease of use and the versatility of the device.

Although the present invention has been described in terms of preferred embodiments, it will be apparent that numerous modifications and variations may be made without departing from the true spirit and scope thereof, as defined in the following claims.

What is claimed is:

1. An optical transducer including:
   a Faraday rotator material;
   means directing linearly polarized light through said rotator material, said rotator producing a rotation in the angle of polarization of said light;
   permanent magnet means adjacent said rotator material and located to produce a biasing magnetic field in said rotator material to bias the rotation of the angle of polarization of said light;
   target means having a parameter to be monitored, said target means modulating said magnetic field in said rotator material to change the rotation of the angle of polarization of said light; and
   means responsive to said change in the rotation of the angle of polarization to produce an output electrical signal corresponding to said target parameter.

2. The transducer of claim 1, wherein said means to direct polarized light through said rotator material includes:
   a source of light having a predetermined wavelength;
   means including a collimator for collimating light from said source and directing it into a first end of said rotator material;
   a first polarizer interposed between said collimator and said rotator material; and
   means collecting light from said rotator material.

3. The transducer of claim 2, wherein said means responsive to said change in rotation includes means to detect said collected light.

4. The transducer of claim 3, wherein said means collecting light includes a second polarizer, said first and second polarizers being located at opposite ends of said rotator material.

5. The transducer of claim 8, further including mirror means at a second end of said rotator material and wherein said means collecting light is at said first end of said rotator.

6. The transducer of claim 1, wherein said target means includes a magnetically permeable material which modulates said magnetic field in said rotator material.

7. The transducer of claim 1, wherein said target means is movable with respect to said rotator material.

8. An optical probe for monitoring a target parameter, comprising
 a Faraday rotator material adapted to be mounted adjacent a target to be monitored;
 first and second light polarizers mounted at first and second ends, respectively, of said material and axially aligned therewith;
 first and second GRIN rods axially aligned with said first and second polarizers respectively;
 a source of light having a predetermined wavelength,
 light detector means for detecting said light of said predetermined wavelength;
 first optical fiber means directing light from said source through said first GRIN lens, through said first polarizer and axially into said material;
 second optical fiber means directing light which passes axially through said material, through said second polarizer and through said second GRIN lens to said light detector means; and
 permanent magnet means adjacent said material and located to produce an axially directed biasing magnetic field in said material to produce a selected bias rotation in the angle of polarization of the light passing through said material, said probe responding to variations in said axially directed magnetic field to vary the rotation in said angle of polarization of light with respect to said selected bias rotation.

9. The probe of claim 8, wherein said first and second polarizers are linear polarizers, and wherein said first polarizer serves to polarize light directed into said material whereby light entering said material has a first, preselected angle of rotation, said Faraday rotator material rotating the angle of said light as it passes therethrough in accordance with the magnitude of the axial magnetic field.

10. The probe of claim 9, wherein said second polarizer is positioned at a second preselected angle of rotation, and serves to receive light from said material, the intensity of the light passing through said second polarizer corresponding to the angle of rotation produced by said material.

11. An optical probe responsive to modulation of an axial magnetic field for monitoring a target parameter, comprising
 a Faraday rotator material adapted to be mounted in proximity to a target to be monitored;
 a first linear light polarizer mounted at a first end of said material and axially aligned therewith;
 a first GRIN lens mounted adjacent said polarizer and axially aligned with said material;
 mirror means mounted at a second end of said material and perpendicular to the axis thereof;
 a source of light having a known wavelength;
 light detector means responsive to said known wavelength;
 optical fiber means for directing light received from said source to said GRIN lens and for directing light received from said GRIN lens to said light detector means, the light which is directed to said GRIN lens passing through said rod and said polarizer into said material, passing axially through said material for reflection from said mirror and returning through said material and through said polarizer to said GRIN lens for direction said detector means; and
 means for producing an axially directed static biasing magnetic field in said material to produce a selected bias rotation in the angle of polarization of light passing through said material and being directed to said detector said probe responding to variations in said biasing magnetic field to vary the rotation of the angle of polarization of said light passing through said material with respect to said bias rotation, said detector producing an output corresponding to said variation in rotation.

12. The probe of claim 11, further including housing means for adjustably receiving said rotator material.

13. The probe of claim 12, wherein said means for producing a biasing magnetic field comprises a permanent magnet mounted in said housing means.

14. The probe of claim 13 wherein said permanent magnet is a ring magnet mounted in axial alignment with said material adjacent one end thereof.

15. The probe of claim 11, wherein said optical fiber means includes at least a directional coupler for directing light received from said GRIN lens to said detector.

16. The probe of claim 15, further including reference detector means responsive to light from said source, said optical fiber means including means directing light from said source through said directional coupler to said reference detector.

17. The probe of claim 11, wherein said optical fiber means includes a first input fiber for directing light from said source to said GRIN lens and a second output fiber for receiving light from said GRIN lens, said first and second fibers being located on diametrically opposite sides of the axis of said GRIN lens.

18. An optical probe responsive to modulation of a permanent magnetic field, comprising:
 a Faraday rotator material;
 means directing linearly polarized light through said rotator material, said rotator material producing a rotation in the angle of polarization of said light;
 stationary permanent magnet means fixed adjacent said rotator material and located to produce a biasing permanent magnetic field in said rotator material, to bias the rotation of the angle of polarization of said light;
 target means having a parameter to be monitored, said target means modulating said biasing permanent magnetic field in said rotator material to vary the rotation of the angle of polarization of said light; and
 means responsive to variations in the rotation of the angle of polarization to produce an output electrical signal corresponding to said target parameter.

19. The optical probe of claim 18, further comprising a protective housing for receiving said rotator material, said directing means and said stationary permanent magnet means.

20. The optical probe of claim 18, wherein said target means is spaced apart from said stationary permanent magnet means and wherein said target means includes a magnetically permeable material which modulates said biasing permanent magnetic field.

21. The optical probe of claim 20, further including means for effecting relative motion between said target means and said permanent magnet means to modulate said biasing permanent magnetic field.

* * * * *

UNITED STATES PATENT AND TRADEMARK OFFICE
CERTIFICATE OF CORRECTION

PATENT NO. : 4,947,035

DATED : August 7, 1990

INVENTOR(S) : Zook et al

It is certified that error appears in the above-identified patent and that said Letters Patent is hereby corrected as shown below:

Claim 5, column 9, line 8, "8" should be --3--.

Signed and Sealed this

Twenty-fourth Day of September, 1991

Attest:

HARRY F. MANBECK, JR.

*Attesting Officer*    *Commissioner of Patents and Trademarks*